2,883,380
DIURETIC XANTHINE DERIVATIVES CONTAINING MERCURY

Walther Persch, Frankfurt am Main Höchst, and Rudi Beyerle, Frankfurt am Main Fechenheim, Germany, assignors to Cassella Farbwerke Mainkur, Aktiengesellschaft, Frankfurt am Main Fechenheim, Germany, a German company No Drawing. Application December 24, 1956
Serial No. 630,015

Claims priority, application Germany December 30, 1955

3 Claims. (Cl. 260—242)

This invention relates to xanthine derivatives containing mercury which are useful as diuretics.

We have found that diruetics containing mercury are obtained by introducing into xanthine derivatives of the general formula

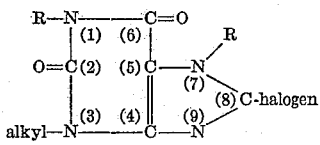

wherein one R means alkyl, the other R means hydrogen, an unsaturated alkyl group, exchanging in the xanthine derivatives thus obtained (in which one R means alkyl, the other R alkenyl) the halogen atom in 8-position against a water-solubilizing group, reacting the products thus obtained with water-soluble mercury compounds and optionally effecting then a neutralization.

For exchanging the halogen atom with a water-solubilizing group, compounds are used which contain a group reacting with halogen and furthermore contain a water-solubilizing group; the group reacting with halogen may simultaneously be the water-solubilizing group. To the latter compounds belong, for instance, amines; as compounds possessing a group exchangeable against halogen and separately therefrom a water-solubilizing group there may be used the carboxylic acids or sulfonic acids of amino-, hydroxy- or mercapto-compounds or even amino-hydroxy compounds.

For neutralizing the xanthine derivatives containing mercury which are obtained according to the invention, any acids or bases may be used, especially also some of these which already themselves exert a therapeutic action.

The new diuretics thus obtained correspond to the general formula

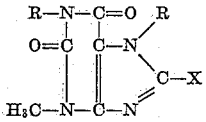

wherein one R means CH₃, the other R

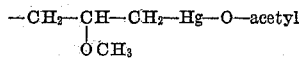

X means a water-solubilizing radical of the group consisting of aminoalkylamino-, dialkyl-amino-ethoxy-, aminoethylamino.

They are of a good compatibility and yield solutions which show, even without an addition of buffering substances, a pH value near the neutral point and are therefore capable of being injected without causing an irritation.

The following examples are given for the purpose of illustrating the invention, the parts being parts by weight.

Example 1

Into a solution of 12 grams of sodium hydroxide in 300 cubic centimeters of water there are introduced, with stirring, 64 grams of 3.7-dimethyl-8-chloroxanthine. The clear reaction solution is heated to 75°, at which temperature 38 grams of allyl bromide are added by drops. Upon cooling, caustic soda lye is added to the reaction mixture until an alkaline reaction can be shown. Thereafter the precipitate which has appeared is isolated by filtering with suction and washed with water until a neutral reaction is present. After drying, the reaction product is recrystallized from alcohol. From the filtrate there may be recovered, by acidifying with diluted hydrochloric acid the non-reacted starting material, Thus the 1-allyl-3,7-di-methyl-8-chloro-xanthine of a melting point of 142–143° is obtained.

In a solution of 2.5 grams of sodium hydroxide in 100 cubic centimeters of 60% ethyl alcohol there are heated 8.5 grams of 1-allyl-3.7-dimethyl-8-chloro-xanthine and 3.9 grams of 80% thioglycolic acid for 1 hour in a water bath at reflux. Upon cooling, the clear reaction solution is acidified with diluted hydrochloric acid and the precipitate thereby formed is isolated by filtering with suction. For further purification it is dissolved in saturated sodium bicarbonate solution and after filtering reprecipitated by means of diluted hydrochloric acid. Subsequently the reaction product is washed with water until no more chlorine ions can be shown to be present in the filtrate. The product constitutes the 1-allyl-3.7-dimethyl-xanthine-mercapto acetic acid (8) of a melting point of 236–237°.

16 grams of 1-allyl-3.7-dimethyl-xanthine mercapto acetic acid (8) are suspended in 300 cubic centimeters of methanol followed by adding, at 40° by drops and with stirring, 16.6 grams of mercuric acetate in 150 cubic centimeters of methanol. The reaction mixture is stirred subsequently for 4 hours at 40°. Thereafter, by filtering with suction, the precipitate is isolated. It is dissolved for further purification in diluted caustic soda lye and reprecipitated by conducting carbon dioxide in. Thus the 1-(3'-acetoxymercuri-2'-methoxy)n-propyl-3.7-dimethyl-xanthine mercapto acetic acid (8) is obtained.

The product may be used in a dissolved form of the sodium salt or of the salt of the 1-diethylamino-ethyl-3.7-dimethyl-xanthine as a diuretic suitable for injection.

Example 2

25 grams of 1-allyl-3.7-dimethyl-8-chloro-xanthine (obtained according to Example 1, paragraph 1) are heated with 300 cubic centimeters of a 35% aqueous dimethylamine solution in an autoclave for 8 hours to 120°. Thereafter the reaction mixture is evaporated in the vacuum to dryness. To the residue, caustic soda lye is added; the base which separates is taken up in chloroform. The chloroform solution is dried with sodium sulfate and subsequently evaporated in the vacuum to dryness. The resulting residue may be recrystallized from isobutyl alcohol. It constitutes the 1-allyl-3.7-dimethyl-8-dimethyl-amino-xanthine of a melting point of 95–96°.

13.2 grams of 1-allyl-3.7-dimethyl-8-dimethylamino-xanthine are dissolved in 120 cubic centimeters of methanol. After adding by drops a solution of 15.9 grams of mercuric acetate in 160 cubic centimeters of methanol, the clear reaction solution is heated to 50° and stirred at this temperature for 4 hours. Thereafter, the solution is evaporated in the vacuum to dryness and the residue is recrystallized from little methanol. Thus, the 1-(3'-acetoxy-mercuri-2'-methoxy)n-propyl-3.7-dimethyl-8-dimethylamino-xanthine-monoacetate is obtained.

Instead of the acetate, the corresponding salt of the theobromin-carboxylic acid (8) may be prepared (for example, by treating the acetate with alkali and subsequently with the said acid) and used as a diuretic.

Example 3

2.3 grams of sodium metal are dissolved in a solution of 10 grams of β-dimethylaminoethanol in 200 cubic centimeters of toluene. Thereafter, 25.4 grams of 1-allyl-3.7-dimethyl-8-chloro-xanthine are added. The reaction mixture is heated for 1 hour to the boil under reflux. After the reaction, the mass is evaporated in the vacuum to dryness and the free base in the residue is purified by recrystallizing from petroleum ether. Thus the 1-allyl-3.7-dimethyl-8-β-dimethylamino-ethoxy - xanthine of a melting point of 71–73° is obtained.

10.2 grams of 1-allyl-3.7-dimethyl-8-β-dimethylamino-ethoxy-xanthine are dissolved in 100 cubic centimeters of methanol, followed by adding, by drops and with stirring, a solution of 10.6 grams of mercuric acetate in 120 cubic centimeters of methanol. The reaction solution is subsequently stirred at 50° for 5 hours. Upon concentrating the clear solution in the vacuum, a feebly yellow-colored, sirupous residue results which is taken up in chloroform for further purification. The chloroform solution is shaken with coal, filtered and evaporated in the vacuum to dryness. Thus the 1-(3'-acetoxy-mercuri-2'-methoxy)n - propyl-3.7-dimethyl-8-β-dimethyl-amino-ethoxy-xanthine-monoacetate is obtained.

The diuretic action of this product was examined in guinea pigs. On the evening before the day of the test, the feed was withdrawn from the animals. On the test-day, the animals received 5 cubic centimeters/100 grams of tap water per os. The animals were placed in metabolism cages, each 2/cage. The quantity of urine was read every one-half hour.

12 animals received (1) 27 milligrams/kilogram (body weight) of the new 1(3'-acetoxy-mercuri-2'-methoxy-n-propyl)-3.7-dimethyl-8-β-dimethylaminoethoxy-xanthine-monoacetate=8 mg./kg. mercury; (2) 20 milligrams/kilogram of the known 1(3'-acetoxy-mercuri-2'-methoxy-n-propyl) - 3.7 - dimethyl-xanthine=8 mg./kg. mercury; (3) control.

Based upon the control value, the excretion of urine after 20 milligrams/kilogram of the known 1(3'-acetoxy-mercuri-2'-methoxy-n-propyl)-3.7-dimethyl-xanthine (=8 milligrams/kilogram Hg) amounts to +60%, after 27 milligrams/kilogram of the new 1(3'-acetoxy-mercuri-2'-methoxy-n-propyl) - 3.7 - dimethyl-8-β-dimethylamino-ethoxy-xanthine-monoacetate (=8 milligrams/kilogram Hg) amounts to +136%.

The preparation has been tested in mice as to its toxicity. The following values were found:

| Preparation | The new 1(3'-acetoxy-mercuri-2'-methoxy-n-propyl)-3.7-dimethyl-8-β-dimethylamino-ethoxy-xanthine-monoacetate | The known 1(3'-acetoxy-mercuri-2'-methoxy-n-propyl)-3.7-dimethyl-xanthine |
|---|---|---|
| LD₅₀ grams/kilogram substance | 1.10 | 0.580 |
| LD₅₀ based upon grams/kilogram mercury | 0.328 | 0.232 |

Administered orally, the new 1(3'-acetoxy-mercuri-2'-methoxy-n-propyl) - 3.7 - dimethyl-8-β-dimethylaminoethoxy-xanthine-monoacetate leads to a urine excretion which is two times as high as in the case of the known 1(3'-acetoxy-mercuri-2'-methoxy-n-propyl)-3.7-dimethyl-xanthine. As also the toxicity is lower with oral administration, this type of application leads to a better therapeutical index of the new preparation in comparison to the known one.

Example 4

A mixture consisting of 25 grams of 1-allyl-3.7-dimethyl-8-chloro-xanthine, 60 grams of 60% ethylene diamine and 300 cubic centimeters of water is heated to the boil for 1 hour under reflux. The reaction mixture which is still hot is then filtered from the insoluble matter. The filtrate is evaporated in the vacuum to dryness. Thereafter the residue is dissolved in little water, the insoluble matter is removed by filtering and the filtrate is rendered alkaline by means of caustic soda lye. The free base is taken up in chloroform. After drying, the chloroform solution is concentrated to dryness and the residue thus produced is recrystallized from isobutyl alcohol. Thus the 1-allyl-3.7-dimethyl-8-β-aminoethyl-amino-xanthine of a melting point of 217–218° is obtained.

To 8.35 grams of 1-allyl-3.7-dimethyl-8-β-aminoethyl-amino-xanthine, dissolved in 80 cubic centimeters of methanol, there is added, by drops and with stirring, a solution of 9.55 grams of mercuric acetate in 120 cubic centimeters of methanol and 2 cubic centimeters of glacial acetic acid. Subsequently the reaction solution is stirred at 40° for 4 hours. After concentrating in the vacuum, a sirupous residue remains which solidifies after some time. It constitutes the 1(3'-acetoxymercuri-2'-methoxy)n - propyl - 3.7 - dimethyl-8-β-aminoethylamino-xanthine-diacetate.

Analogous compounds with a diuretic action of the same type are obtained when starting from 1.3-dimethyl-8-chloro-xanthine. When using instead of said 8-chloro-xanthine derivatives the corresponding bromine compounds, the same diuretics containing mercury are obtained.

Example 5

3.3 grams of sodium metal are dissolved in a solution of 40 grams of diethylaminoethanol in 40 cubic centimeters of absolute toluene. 43 grams of 1.3-dimethyl-7-ally-8-bromo-xanthine (obtained by reacting allyl bromide with 8-bromotheophyllin) are then added. The reaction mixture is boiled for 1 hour at reflux. Thereafter the mass is concentrated by evaporation in the vacuum to dryness and the resulting residue is dissolved in diluted hydrochloric acid. For further purification, the aqueous solution is shaken with charcoal and filtered over diatomaceous earth. To the filtrate there is added caustic soda lye and potash until an alkaline reaction can be shown. The free base which separates is taken up in chloroform.

After drying, the chloroform solution is concentrated by evaporation to dryness. The oily residue solidifies after some time to form a compact crystal paste. Extraction with petroleum ether delivers a pure crystallized product of a melting point of 60–61° which constitutes the 1.3-dimethyl-7-allyl-8-β-diethylaminoethoxy-xanthine. 10 grams of this product are dissolved in 120 cubic centimeters of methanol, and a solution of 9.5 grams of mercuric acetate in 100 cubic centimeters of methanol and 2 cubic centimeters of glacial acetic acid is added by drops and with stirring. Thereafter the reaction solution is stirred for 5 hours at 50° The oily residue which results after removing the methanol by distillation in the vacuum is dissolved in chloroform for further purification, shaken with charcoal and filtered. The filtrate is evaporated in the vacuum to dryness. Thus the 1.3-dimethyl-7-(3'-acetoxy-mercuri - 2'-methoxy)n-propyl-8-β-diethylamino-ethoxy-xanthine-monoacetate is obtained.

We claim:
1. A xanthine derivative of the general formula

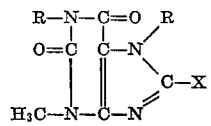

wherein one R is —CH₃ and the other R is
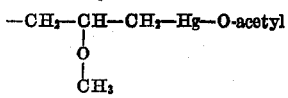
and X is a monovalent radical of the group consisting of aminoethylamino, dimethylaminoethoxy, and diethylaminoethoxy.
2. A xanthine derivative of the formula
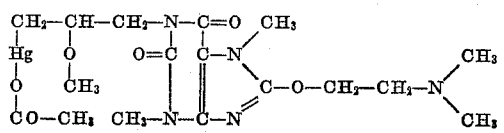
3. A xanthine derivative of the formula
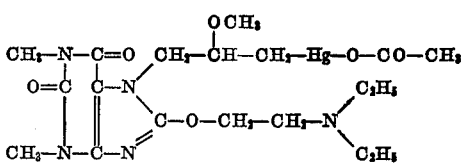
References Cited in the file of this patent
UNITED STATES PATENTS
1,948,179     Lautenschlager et al. _____ Feb. 20, 1934